United States Patent
Schroeder et al.

(10) Patent No.: US 7,843,171 B2
(45) Date of Patent: Nov. 30, 2010

(54) METHOD AND APPARATUS FOR BATTERY CHARGING BASED ON BATTERY CAPACITY AND CHARGING SOURCE CONSTRAINTS

(75) Inventors: Warren Richard Schroeder, Fuquay Varina, NC (US); Alan Burchfield, Sherman Oaks, CA (US); Thomas Joseph Karpus, Cary, NC (US)

(73) Assignee: Semtech Corporation, Morrisville, NC (US)

( * ) Notice: Subject to any disclaimer, the term of this patent is extended or adjusted under 35 U.S.C. 154(b) by 236 days.

(21) Appl. No.: 12/017,153

(22) Filed: Jan. 21, 2008

(65) Prior Publication Data

US 2009/0184687 A1 Jul. 23, 2009

(51) Int. Cl.
*H02J 7/00* (2006.01)
*H02J 1/10* (2006.01)
*H02J 3/00* (2006.01)

(52) U.S. Cl. .................. 320/138; 320/128; 307/43; 307/56; 307/72

(58) Field of Classification Search .................. 320/138
See application file for complete search history.

(56) References Cited

U.S. PATENT DOCUMENTS 6,836,095 B2 * 12/2004 Fogg .................. 320/128
7,069,347 B1 * 6/2006 Kolokowsky .................. 710/8
7,495,416 B2 * 2/2009 Sato et al. .................. 320/134
7,528,574 B1 * 5/2009 Adkins et al. .................. 320/128
7,528,582 B1 * 5/2009 Ferguson .................. 320/164
2004/0164708 A1 * 8/2004 Veselic et al. .................. 320/132
2008/0303352 A1 * 12/2008 Hsieh et al. .................. 307/113

OTHER PUBLICATIONS

Author Unknown. "USB Power Controller and Li-Ion Linear Charger." Linear Technology, LTC4055 Data Sheet, publication date unknown.

* cited by examiner

*Primary Examiner*—Edward Tso
*Assistant Examiner*—Ahmed Omar
(74) *Attorney, Agent, or Firm*—Coats & Bennett, P.L.L.C.

(57) ABSTRACT

A battery charging circuit sets charging current according to either the capacity of the battery under charge or a constraint of the charging source, depending on the properties of the charging source. The battery charging circuit sets termination current, however, according to the capacity of the battery under charge, regardless of the properties of the charging source. For example, the termination current may be set as a fixed fraction of the recommended C rate of the battery even if the charging current supplied by the charging source is below this C rate. Always setting the termination current in proportion to the battery's capacity permits detection of the current at which charging should terminate even when the charging current is constrained by the charging source and no longer depends on the battery's capacity.

20 Claims, 11 Drawing Sheets

METHOD AND APPARATUS FOR BATTERY CHARGING BASED ON BATTERY CAPACITY AND CHARGING SOURCE CONSTRAINTS

BACKGROUND OF THE INVENTION

1. Technical Field

The present invention generally relates to battery charging methods and apparatus, and particularly relates to a battery charging method and apparatus having certain charging properties that depend on the charging source while having other charging properties that depend on battery capacity regardless of the charging source.

2. Background

Rechargeable batteries appear in a growing range of electronic devices. The use of rechargeable batteries is particularly common in portable electronics, such as cell phones, Portable Digital Assistants (PDAs), pocket and notebook computers, Global Positioning System (GPS) receivers, etc. No one rechargeable battery type finds universal usage across this diverse range of devices, as each battery type offers its own set of tradeoffs regarding performance, size and cost.

For example, types of rechargeable batteries include, but are not limited to, lead-acid cells, nickel-cadmium cells, nickel-metal hydride cells, sodium-sulfur cells, nickel-sodium cells, lithium-ion cells, lithium polymer, manganese-titanium (lithium) cells, nickel-zinc cells, and iron-nickel cells. Each of these battery chemistries offers its own mix of advantages and disadvantages regarding size, energy density (volumetric or gravimetric), cost, cell voltage, cell resistance, safety, toxicity, etc.

Despite such differences, some charging algorithms find broad applicability across a wide range of battery chemistries. As an example, the constant-current/constant-voltage (CC/CV) charging algorithm is adaptable to many different types of battery chemistries and, therefore, finds wide usage in a variety of battery charging products. With the CC/CV charging algorithm, a discharged battery is charged at a constant current until its cell voltage rises to a defined threshold voltage, e.g., the battery's "float voltage," at which point the charging control is switched to constant-voltage to charge the remaining capacity of the battery without exceeding the voltage limit of the battery.

In order to maintain constant current and constant voltage, the CC/CV charging algorithm initially relies on current feedback control and then switches over to voltage-feedback control, once the battery-under-charge reaches its float voltage. The charging algorithm may, however, continue to monitor the current during constant-voltage control in order to detect when the battery has completed charging. Detecting when the battery has completed charging and correspondingly terminating the charging current is important for avoiding damage to the battery and preserving battery life.

Because the amount of charging current that a battery will accept decreases as the battery approaches full charge, the algorithm may terminate charging when the monitored charging current falls to a defined termination current. Ideally, the termination current should be set to yield maximum battery charging while avoiding potentially dangerous excess charging of the battery. This termination current detected during the CV phase of recharge and the charging current permitted during the CC phase of recharge may both depend on the battery's capacity.

To illustrate, the charging current permitted during the CC phase of recharge should be as high as possible within recommended limits because higher charging currents equate to lower recharge times. Battery manufacturers often rate battery capacity in terms of a given battery's "C rating," which is a scaling unit for the battery's charge and discharge currents. Charging or discharging the battery at rates beyond the "C" rating exceeds the safe rating of the battery. For example, many manufacturers' recommendations specify charging currents not exceeding 1C for safety reasons. Thus, charging current during the CC phase of recharging may be set in proportion to the battery's capacity by setting the charging current at the manufacturer's recommended C rate limit.

Similarly, the termination current detected during the CV phase of recharge may also be set according to the recommended C rate limit as the current that a battery draws when fully charged likewise depends on the battery's capacity. When both the charging current and the termination current depend on the battery's capacity, the termination current is necessarily smaller than, although proportional to, the charging current. As a matter of designing a battery charging system, then, the charging current may be set in proportion to the battery's capacity and the termination current set as a fixed fraction of the charging current. The termination current may, for example, be set to detect a fully charged battery when the charging current falls to 10 percent of the charging current permitted during the CC phase of recharge.

One of the many challenges faced by designers of battery charging systems arises, however, when the battery charging system permits charging a battery-powered device from various types of sources, which may or may not be capable of charging the battery according to the appropriate capacity-based charging strategy. For example, a given charging source may not be able to charge at the battery's recommended C rate. Instead, characteristics of the source may constrain the charging current permitted during the CC phase of recharge. More particularly, many battery-powered devices interface to Personal Computers (PCs) and the like via Universal Serial Bus (USB) connections having a voltage bus (VBUS). Portable music players, such as those based on the popular MP3 digital audio format, are just one example of such devices.

Regardless, the USB standard defines a low-power device as one that draws no more than 100 mA of current, and defines a high-power device as one that draws up to 500 mA. Devices that would like to draw current up to the high-power 500 mA limit must first request, and be granted, permission to do so from the USB port host. Until granted such permission, the requesting device must draw no more than 100 mA. Thus, to comply with the USB specification, a device wishing to charge its battery at the high power current limit must also support the low power current limit, and be able to switch between the two limits.

Thus, some USB ports may not allow battery charging currents above the low-power limit of 100 mA. Moreover, some adapter charging sources, especially those not dedicated to the particular battery-powered device being charged, may be incapable of supplying current at the battery's C rate. Thus, the battery's capacity may permit a greater charging current than a charging source is capable of providing.

Instances where the charging source cannot provide the appropriate CC phase charging current present a number of problems. For example, it is known to set the termination current as a fraction of the CC phase charging current, reflecting the assumption that the CC phase charging current is appropriate in magnitude for the capacity of the battery being charged. Thus, to the extent that the CC phase charging current does not have the appropriate magnitude given the battery's capacity, the termination current necessarily will have the wrong magnitude in relation to the battery's capacity. In a similar fashion, the pre-charge current, used to prepare a deeply discharged battery cell for the CC phase charging current, also depends on the battery capacity. Setting the pre-charge current as a fraction of the CC phase charge current thus is appropriate only to the extent that the charge current itself is set according to battery capacity, rather than according to one or more source constraints.

SUMMARY OF THE INVENTION

According to one or more embodiments, the teachings presented herein provide a method and apparatus for charging batteries where the fast charging current is set according to the battery's capacity or set according to a charging source constraint, in dependence on the properties of the charging source. Advantageously, however, the termination charging current is set according to the battery's capacity, irrespective of whether the fast charging current was set according to battery capacity or according to the relevant charging source constraint. In at least one embodiment, such flexibility is extended to pre-charging current control.

Note that unless otherwise specified, the balance of this disclosure uses "charging current" to refer to the output current provided by a battery charging circuit to a battery during the primary or fast charging portion of a battery charging cycle, and uses "termination current" to refer to the output current provided to the battery during the termination portion of a battery charging cycle. Similarly, this disclosure uses "pre-charge current" to refer to the output current provided to the battery during the pre-charging portion of a battery charging cycle, such as may be used to condition a deeply discharged battery before applying charging current to it.

With such terminology in mind, in an example embodiment, a battery charging circuit includes two charging source input connections. If the first charging source input connection is used, the battery charging circuit operates in a first mode (MODE1), wherein it sets the charging and termination currents it provides to a battery being charged in accordance with battery capacity. That capacity is indicated by a first programmed value. (The battery charging circuit also may provide pre-charge current in accordance with battery capacity, while operating in MODE1.) Conversely, if the second charging source input connection is used, the battery charging circuit operates in a second mode (MODE2), wherein it sets the charging current in accordance with a charging source constraint, as indicated by a second programmed value. Advantageously, however, the battery charging circuit still sets the termination current in accordance with battery capacity. For MODE2, the battery charging circuit also may set the pre-charge current according to battery capacity.

In another example embodiment, the battery charging circuit includes one charging source input, but detects whether it should operate in MODE1 or MODE2. For example, the battery charging circuit may logically detect the type of charging source attached to it, to determine which mode it should operate in. Such detection may be based on detecting closed or open indicators at the input, detecting input voltage levels, or essentially any other mechanism for distinguishing between attached charging source types, as will be appreciated by those skilled in the art.

Regardless of such circuit implementation details, one embodiment of a method of charging a battery as taught herein comprises selecting a first mode of operation for a first type of charging source and selecting a second mode of operation for a second type of charging source. The first mode of operation may be selected, for example, when charging from a dedicated charging source intended for use with the battery being charged (e.g., an "adapter" charging source that can supply charging current matched to the actual capacity of the battery). Conversely, the second mode of operation may be selected when charging from a non-dedicated charging source that cannot supply the appropriate capacity-based charging current, or is otherwise constrained (e.g., a USB voltage bus charging source).

The battery charging method further comprises setting a charging current and a termination current in proportion to the battery's capacity when operating in the first mode, and setting the charging current according to a charging source constraint, while still setting the termination current in proportion to the battery's capacity, when operating in the second mode. The charging current may be set according to a charging source constraint, for example, by setting the charging current according to a current limit of the charging source, such as a limit of 100 mA for a USB charging source that only supports low power devices.

In one or more embodiments, setting the charging current and termination current in proportion to the battery's capacity when operating in the first mode comprises determining the charging current and the termination current based on a first programmed value set in accordance with the battery's capacity. Likewise, setting the charging current according to a charging source constraint, while still setting the termination current in proportion to the battery's capacity, when operating in the second mode comprises determining the termination current based on the first programmed value, but determining the charging current based on a second programmed value set in accordance with the charging source constraint.

In one or more embodiments, the first and second programmed values are represented as first and second program resistors, or, more generally, as one or more first program elements and one or more second program elements. Thus, the user sizes or otherwise selects the first program element(s) in accordance with the battery charging circuit's output current magnitude desired for capacity-based fast charging of the battery. Similarly, the user sizes or otherwise selects the second program element(s) in accordance with the battery charging circuit's output current magnitude desired for source-constrained fast charging of the battery.

With the above configuration, the battery charging circuit includes a sense circuit that generates a first current that follows the battery-charging circuit's output current to the battery, i.e., follows the battery current. The battery charging circuit further includes a first terminal for sourcing this first current into the first program element(s), such that a first sense signal is generated proportional to the battery charging circuit's output current, with a sensitivity set by the selected value of the first program element(s). Likewise, the sense circuit generates a second current that follows the battery charging circuit's output current, and includes a second terminal for sourcing this second current into the second program element(s). Thus, a second sense signal is generated proportional to the battery charging circuit's output current, with a sensitivity set by the selected value of the second program element(s).

The value of the first program element is set or adjusted by the user in accordance with the battery capacity—e.g., the resistance or impedance of the first program element(s) is set such that the battery charging circuit sets its output current during fast charging to a current magnitude that is appropriate for the battery capacity. Likewise, the value of the second program element is set or adjusted by the user in accordance with the charging source constraint—e.g., the resistance or impedance of the second program element(s) is set such that the battery charging circuit sets its output current during fast charging to a current magnitude that is appropriate for the known or expected charging source constraint.

Accordingly, in MODE1, the battery charging circuit, e.g., by operation of a control circuit within it, controls the charging current magnitude based on evaluating the first sense signal. Conversely, in MODE2, the battery charging circuit controls the charging current magnitude based on evaluating the second sense signal, but controls the termination charge current based on evaluating the first sense signal. Thus, in MODE2, the battery charging circuit advantageously bases the termination current on battery capacity, despite limiting the charging current according to the charging source constraint. Note that, in one or more other embodiments, the battery charging circuit may use different or adjusted reference signals, e.g., different reference voltages, for evaluating the first and second sense signals, and, in this manner, some embodiments may use the second sense signal for termination charging current control, but still do so in a manner that bases magnitude control of the termination current on the battery capacity.

In one or more other embodiments, the battery charging circuit uses alternative current-control and detection reference voltages. Doing so provides further flexibility in the setting of charge current, precharge current, and termination current, while maintaining current proportionality to the battery capacity setting or charge source limitation setting and thereby preserving MODE1 and MODE2 dependency, as appropriate. As a non-limiting example, termination current may be chosen to be 15 percent of MODE1 charge current, rather than 10 percent of MODE1 charge current, by judicious selection of the termination reference voltage. Another non-limiting example is the programming of USB low power mode charge current to be 20 percent of the MODE2 charge current, which is programmed to supply the permitted 500 mA USB high power mode charge current. Many other such examples and variations are contemplated herein and those skilled in the art will recognize additional possibilities.

Additionally or alternatively, one or more method and apparatus embodiments presented herein monitor the battery charging circuit's source voltage (input voltage) as a basis for controlling output charging current to the battery. For example, the battery charging circuit may be configured to source charging current up to the capacity-based or source-constrained limit, provided that doing so does not pull the input voltage below a defined lower limit. In particular, this under-voltage protection may be used by the battery charging circuit while operating in the source-constrained mode (MODE2), meaning that it provides as much charging current as it can, up to the limit defined by the second program element(s), provided that doing so does not pull the battery charging circuit's input voltage below the defined undervoltage threshold. Such operation safeguards against excessively loading down the charging source or disrupting the operation of other devices or systems, which also receive their power from the same charging source.

Of course, the present invention is not limited to the above features and advantages. Indeed, those skilled in the art will recognize additional features and advantages upon reading the following detailed description, and upon viewing the accompanying drawings.

DETAILED DESCRIPTION OF THE INVENTION

Figure 1:
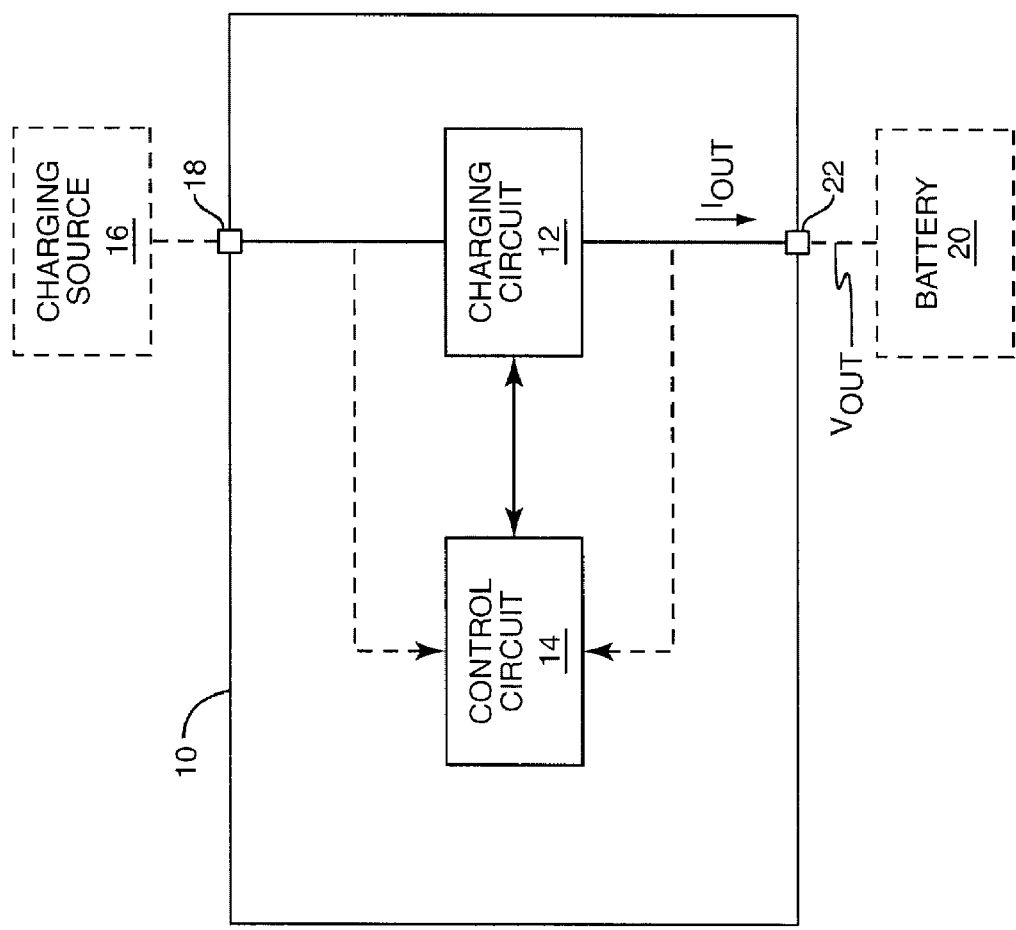
FIG. 1 is a block diagram of one embodiment of a battery charging circuit comprising a control circuit and a charging circuit.

As a non-limiting example, FIG. 1 illustrates an embodiment of a battery charging circuit 10. Battery charging circuit 10 may comprise a charging circuit 12 and a control circuit 14. The exemplary battery charging circuit 10 may be coupled to one or more charging sources 16 via one or more source input ports 18, and may be further coupled to a battery 20 via a battery output port 22.

In operation, charging circuit 12 is configured to provide a charging current between charging source 16 and battery 20. The charging circuit 12 operates under control of the control circuit 14, which sets the charging circuit in dependence on the type of charging source 16 connected at source input port 18. Control circuit 14 may also set the magnitude of any required pre-charge current, as well as an end-of-charge condition (i.e. the termination current) for terminating the charging current, depending on the type of charging source 16 connected. Such may be done by, for example, the control circuit 14 selecting different modes of operation for different types of charging sources.

As a simple example, in response to detecting that the charging source 16 is a first type, the control circuit 14 sets the charging current based on a programmed value, e.g., set by a "program" resistor or other user-selected setting, which relates to the capacity of the battery 20. The control circuit 14 further sets the termination current as an appropriate fraction of the charging current, thereby making the termination current also proportionate to the capacity of the battery 20. Conversely, in response to detecting that the charging source 16 is a second type, the control circuit sets the charging current based on another programmed value, e.g., another "program" resistor or other user-selected setting, which relates to a constraint of the charging source. Thus, the control circuit 14 sets the charging current based on this constraint-related value rather than the battery capacity. However, the control circuit 14 still sets the termination current based on the capacity-related program value, or otherwise still sets the termination current as a function of battery capacity.

The first type of charging source may be, for example, a dedicated adaptor, such as a transformer-based AC-to-DC "wall charger." In most cases, such adaptors will have been designed with the specific battery charging needs in mind, and thus the source capabilities of the charging source allow for proper capacity-based charging currents. On the other hand, the second type of charging source may be, for example, a non-dedicated adaptor, such as a universal charger not necessarily designed with any specific battery capacity in mind. As another example, the second type of charging source may be a communication or computer bus voltage signal, intended to provide power to a number of devices connected in parallel or serially to the bus. One non-limiting example of this type of voltage source is a Universal Serial Bus (USB) connection, which provides a voltage bus (VBUS) signal from which a constrained amount of current may be drawn.

Regardless of the type of charging source, various charging sources 16 may be connected to battery charging circuit 10 via a single source input port 18, as illustrated in the embodiment of FIG. 1. In such cases, the battery charging circuit 10 may detect a signal characteristic of the attached charging source 16 to identify the type of charging source. Alternatively, another signal or setting may be used to logically indicate which type of charging source 16 is connected to the port 18. Such an arrangement is advantageous where it is desirable to use only one connection point for different types of charging sources.

Figure 2:
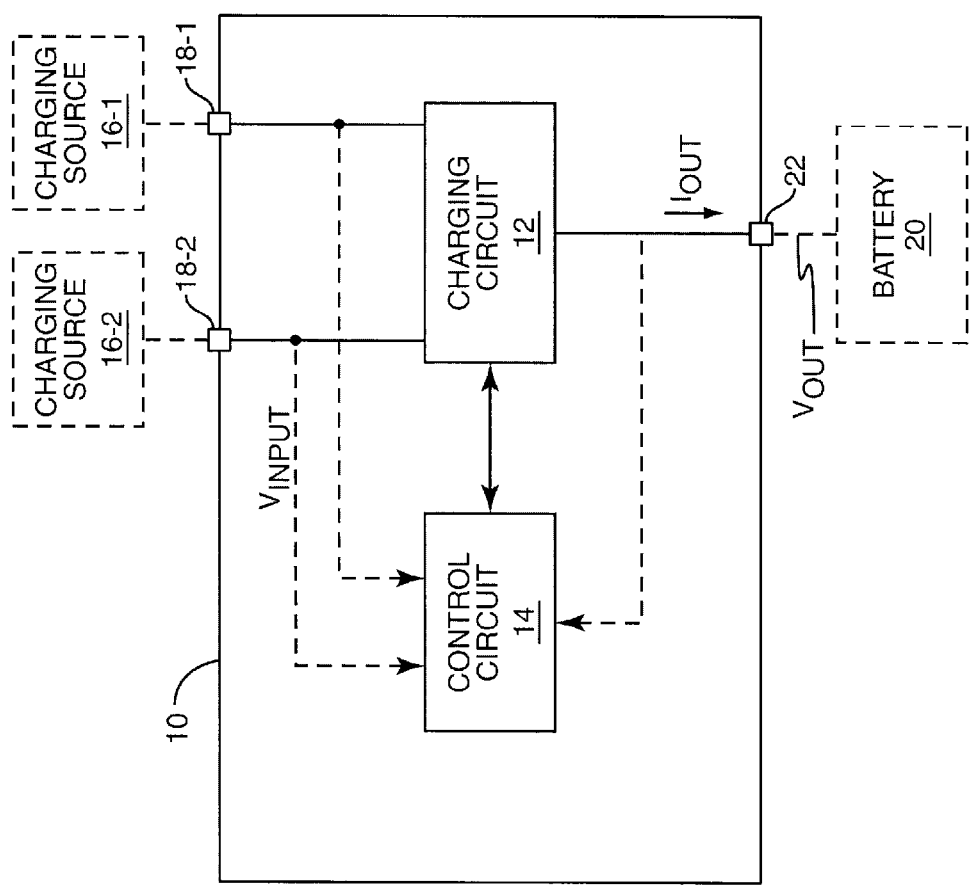
FIG. 2 is a block diagram of an alternative embodiment of a battery charging circuit having two charging source input ports.

As an alternative, shown in FIG. 2, the battery charging circuit 10 may have more than one source connection, e.g., 18-1 and 18-2. Thus, a first type of charging source 16-1 connects to port 18-1 and a second type of charging source 16-2 connects to port 18-2. The charging sources 16-1 and 16-2 may be connected to the multiple source input ports 18-1 and 18-2 either simultaneously or only one at a time. In either embodiment, however, control circuit 14 may select a mode of operation based on the battery capacity and/or based on relevant charging source constraints according to the method illustrated in FIG. 3, for example.

Figure 3:
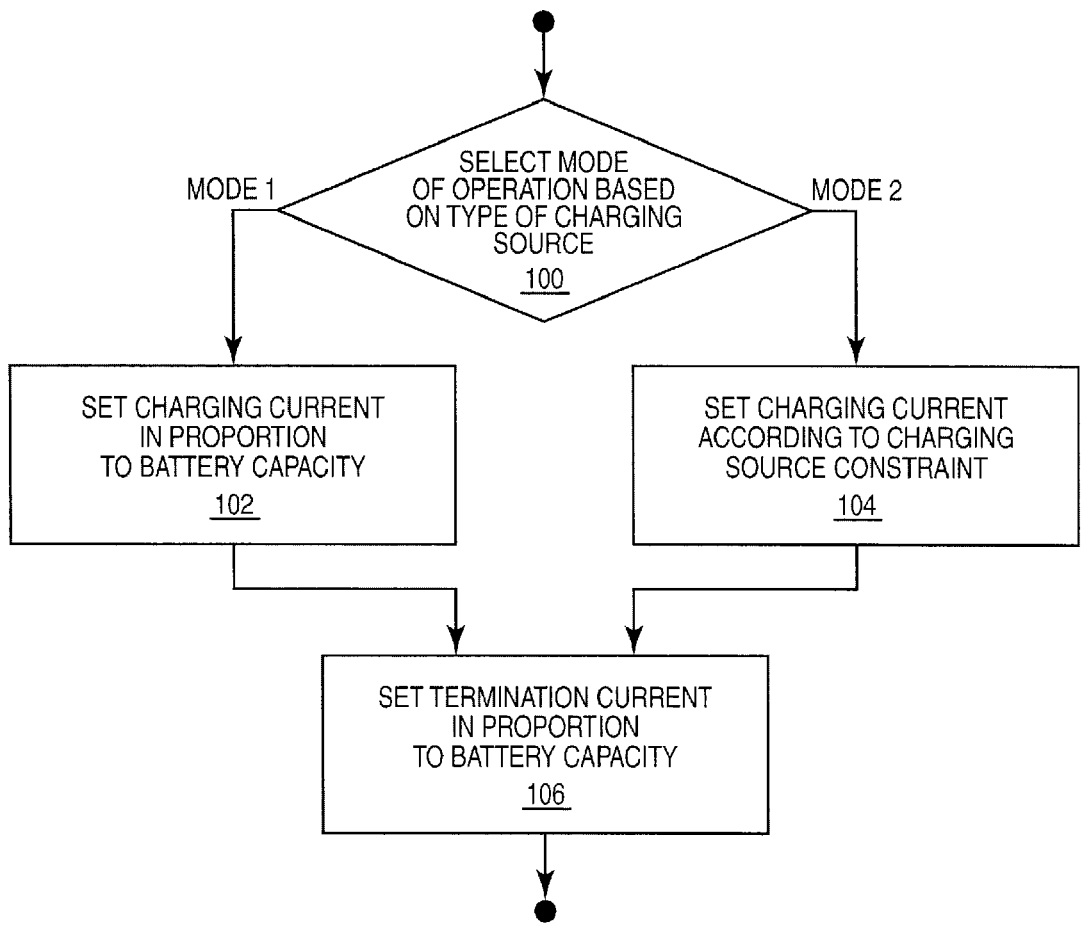
FIG. 3 is a logical flow diagram of one embodiment of the control processing implemented by an exemplary control circuit.

In FIG. 3, the control circuit 14 determines whether to operate the battery charging circuit 10 in a first mode, where the charging and termination currents are set according to battery capacity, or to operate the battery charging circuit 10 in a second mode, wherein the charging current is set according to a source constraint, but where the termination current still is set according to battery capacity (Block 100).

In one embodiment, the control circuit 14 makes this determination based on sensing or otherwise detecting the type of charging source. Examples of such detection include connection pin detection (open/closed, make/break, etc.) where the connector of the charging source 16 is used to provide an indication of its type. Other embodiments make the determination by sensing voltage levels or one or more other signal characteristics that can be used to differentiate one type of charging source from another type. In still other embodiments, the determination is logical, such as based on a configuration value, control signal input, or the like.

In any case, if the first mode of operation is selected ("MODE 1"), the control circuit 14 sets the charging current in proportion to the battery capacity (Block 102). For example, the battery charging circuit 10 may provide a "programming pin" or other connection to which a resistor or other component can be attached in a predetermined manner, and wherein the size or value of that user-selected component corresponds to the battery capacity and thus sets the charging current as a function of the battery capacity.

Conversely, if the second mode of operation is selected ("MODE 2"), the control circuit 14 sets the charging current according to a charging source constraint (Block 104). For example, the battery charging circuit 10 may provide another programming pin or additional other connection to which a resistor or other component can be attached in a predetermined manner, and wherein the size or value of that user-selected component corresponds to the charging source constraint and thus sets the charging current as a function of the charging source constraint.

The above arrangement provides for significant flexibility, in that user-selectable component values set or otherwise control the programmed values that define or otherwise relate to the battery capacity and the charging source constraint. Consequently, the same configuration of battery charging circuit 10 can be used for a potentially wide range of battery capacities and for varied charging source constraints, because the user (e.g., system designer) simply selects the appropriate value of programming components to set the charging current in the different modes.

On the other hand, it is also contemplated herein that the battery charging circuit 10 may receive data or otherwise receive some form of signaling that sets the charging current in one or more modes. It is further contemplated herein, that different configurations of the battery charging circuit 10 may be made, such as where one configuration has a preset value for the charging current in one or more modes. Such configurations may be advantageous where space is at a premium and a single-package device with no (or very few) external components is desired.

In any case, the processing flow of FIG. 3 illustrates that the termination current may be set as a function of battery capacity irrespective of whether the battery charging circuit 10 charged the battery 20 in the first or second mode of operation (Block 106). Thus, the control circuit 14 advantageously sets the termination current as a fixed fraction, such as 10 percent, of the capacity-based charging current appropriate for the C rating of battery 20, even if charging source 16 cannot supply a charging current at this C rate.

This approach allows the battery charging circuit 10 to set charging and termination currents as a function of battery capacity, at least for charging sources that can support the current magnitude needed for the capacity-based charging current, while further allowing the battery charging circuit 10 to constrain the charging current according to a charging source constraint, rather than battery capacity. Such operation permits the termination current to be set according to its actual dependency on the capacity of battery 20 even when the charging current is constrained by charging source 16 and no longer depends on the capacity of battery 20. Setting termination current based on its actual dependency may, for example, reduce charge time, better preserve battery life, and more effectively prevent battery damage.

It should be understood that the control steps illustrated in FIG. 3 may be performed as part of a larger set of control tasks, and/or that they may be performed as part of an ongoing process. Block 100 may be repeated, for example, at time intervals, or performed on an as-needed basis in order to continuously monitor the type of charging source 16 connected to battery charging circuit 10. Further, Block 102 or 104 may not be performed immediately after Block 100 or immediately before Block 106.

Figure 4:
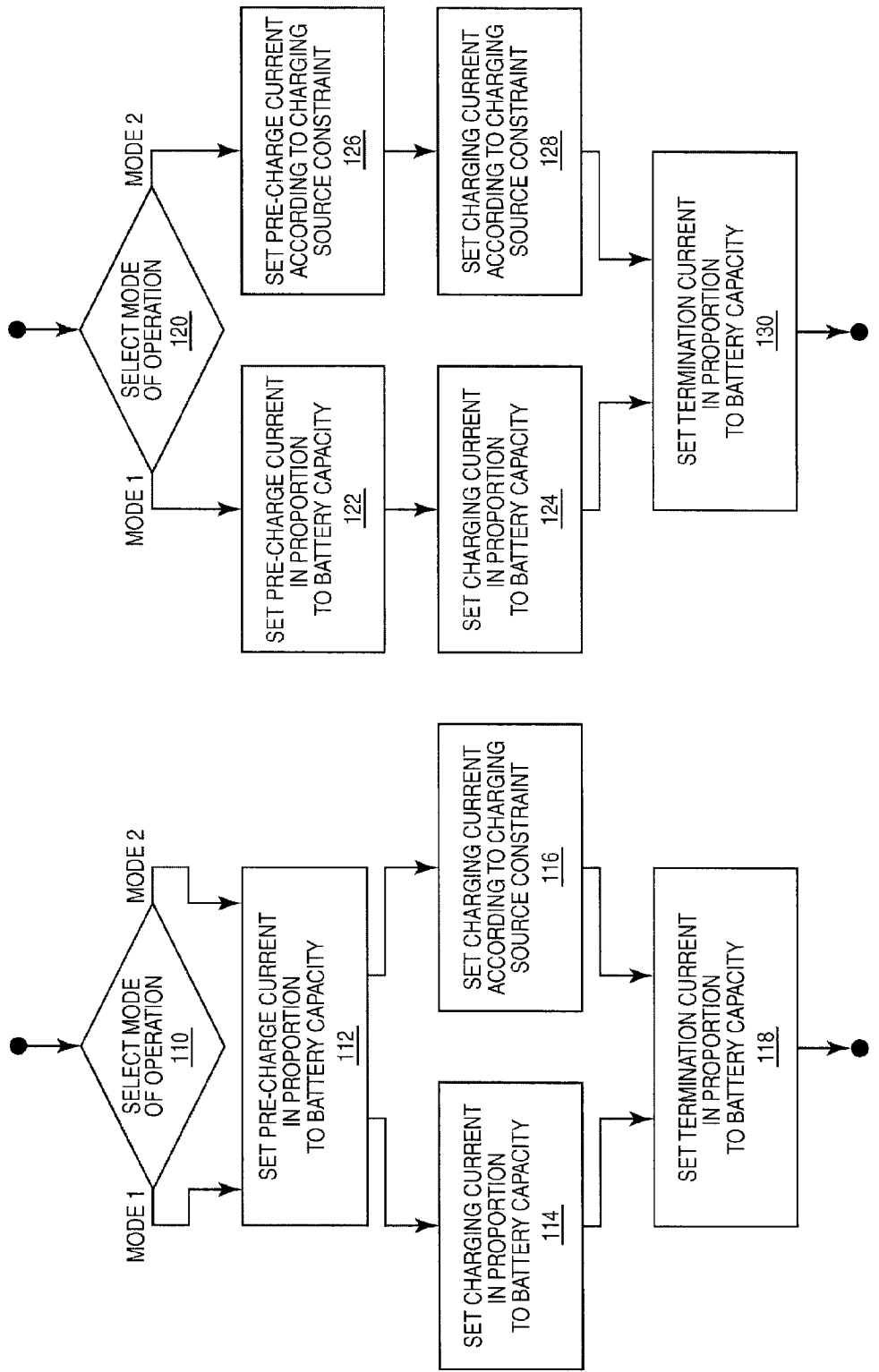
FIGS. 4A-4B are logical flow diagrams of alternative embodiments of the control processing implemented by an exemplary control circuit.

For example, if battery 20 requires conditioning before the control circuit 14 applies charging current, the method described in FIG. 3 may be modified to the methods illustrated in FIGS. 4A-4B. In particular, the embodiment illustrated in FIG. 4A illustrates a configuration of the control circuit 14 where it selects the mode of operation (MODE 1 or MODE 2) (Block 110), but sets the pre-charge current for the battery 20 at a magnitude proportionate to the capacity of battery 20 regardless of the mode selection (Block 112). Thereafter, the mode selection determines whether charging current is set according to battery capacity (Block 114), or set according to a source constraint (Block 116). Finally, for both modes, the termination current is set in proportion to battery capacity (Block 118).

In the embodiment illustrated in FIG. 4B, however, the control circuit 14 again selects the operating mode based on charging source type (Block 120), however pre-charge and charging currents are mode-specific. That is, the pre-charge and the charging currents in MODE 1 are set according to battery capacity (Blocks 122 and 124). Conversely, for MODE 2 operation, the pre-charge and charging currents are set according to the source constraint (Blocks 126 and 128). As with the logic of FIG. 4A, the termination current for both modes is set according to battery capacity (Block 130).

Figure 5:
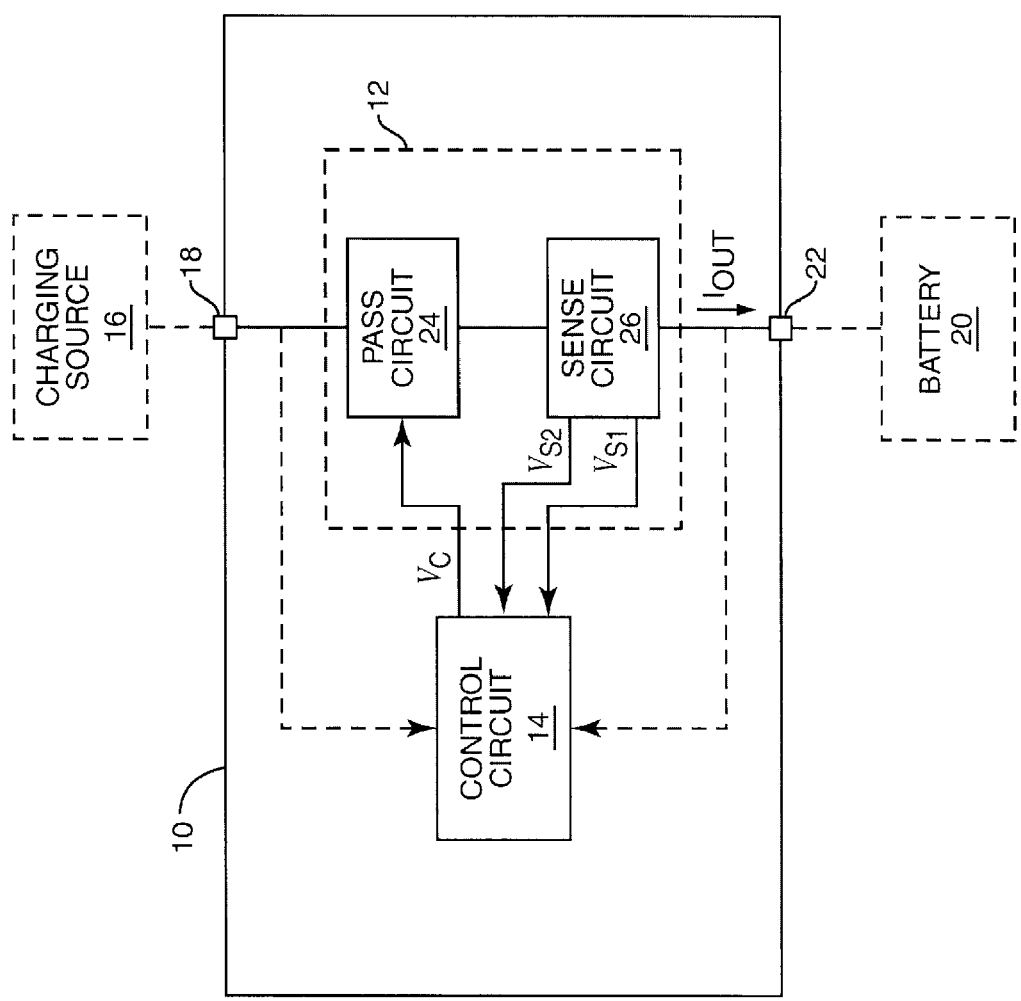
FIG. 5 is a block diagram of the details for an exemplary charging circuit.

With these and other operational variations in mind, FIG. 5 illustrates a simplified embodiment of the battery charging circuit 10, wherein non-limiting example details are given for the charging circuit 12. More particularly, the illustrated charging circuit 12 comprises a pass circuit 24 and a sense circuit 26.

The pass circuit 24 regulates the charging current between charging source 16 and battery 20 responsive to the control circuit 14. The pass circuit 24 may, for example, respond to a control signal ($V_C$) supplied by the control circuit 14. The control signal ($V_C$) may have a voltage proportional to the magnitude of charging current that a pass device within the pass circuit 24 should permit between the charging source 16 and the battery 20. For example, if the control circuit 14 has selected the first mode of operation, the control circuit 14 may supply a control signal ($V_C$) that causes the pass circuit 24 to permit a charging current to flow to the battery 20 with a magnitude corresponding to the recommended C rate of battery 20. Alternatively, if control circuit 14 has selected the second mode of operation, the control circuit 14 generates the control signal ($V_C$) such that it causes the pass circuit 24 to permit a defined maximum charging current corresponding to a current limit of the charging source 16.

The pass device within the pass circuit 24 may simply comprise a pass transistor driven by $V_C$, such that it functions as a voltage-controlled resistor placed in series in the battery's charging current path. Those skilled in the art will appreciate, however, that other voltage-mode or current-mode control circuits, such as Pulse-Width-Modulation (PWM) based feedback control circuits, may also be used to effect regulation of the charging current.

Although the embodiment described in FIG. 5 illustrates only a single charging source 16 connected at any one time via a single source input port 18, those skilled in the art will appreciate that the embodiment described in FIG. 5 may be modified to accommodate multiple charging sources 16 connected simultaneously or one at a time via multiple source input ports 18. Such modification is shown in FIG. 6, where pass circuit 24 may include multiple pass devices 28, each of which regulates the charging current from one of multiple charging sources 16 connected via multiple source input ports 18.

Further, each pass device 28 may respond to a different control signal ($V_{C1}$ and $V_{C2}$) supplied by the control circuit 14. Each control signal ($V_{C1}$ and $V_{C2}$) may correspond to a different mode of operation selected by control circuit 14 and, therefore, it may be that only one control signal is active at any one time. For example, if the control circuit 14 has selected the first mode, the control circuit 14 may provide a control signal ($V_{C1}$) that controls a first pass device 28 to pass a charging current set according to the battery capacity—e.g., as set by a battery-capacity related programmed value. Conversely, if the control circuit 14 has selected the second mode, it provides a control signal ($V_{C2}$) that controls a second pass device 28 to pass a charging current set according to a source constraint—e.g., set by a programmed value relating to the charging source constraint.

Figure 6:
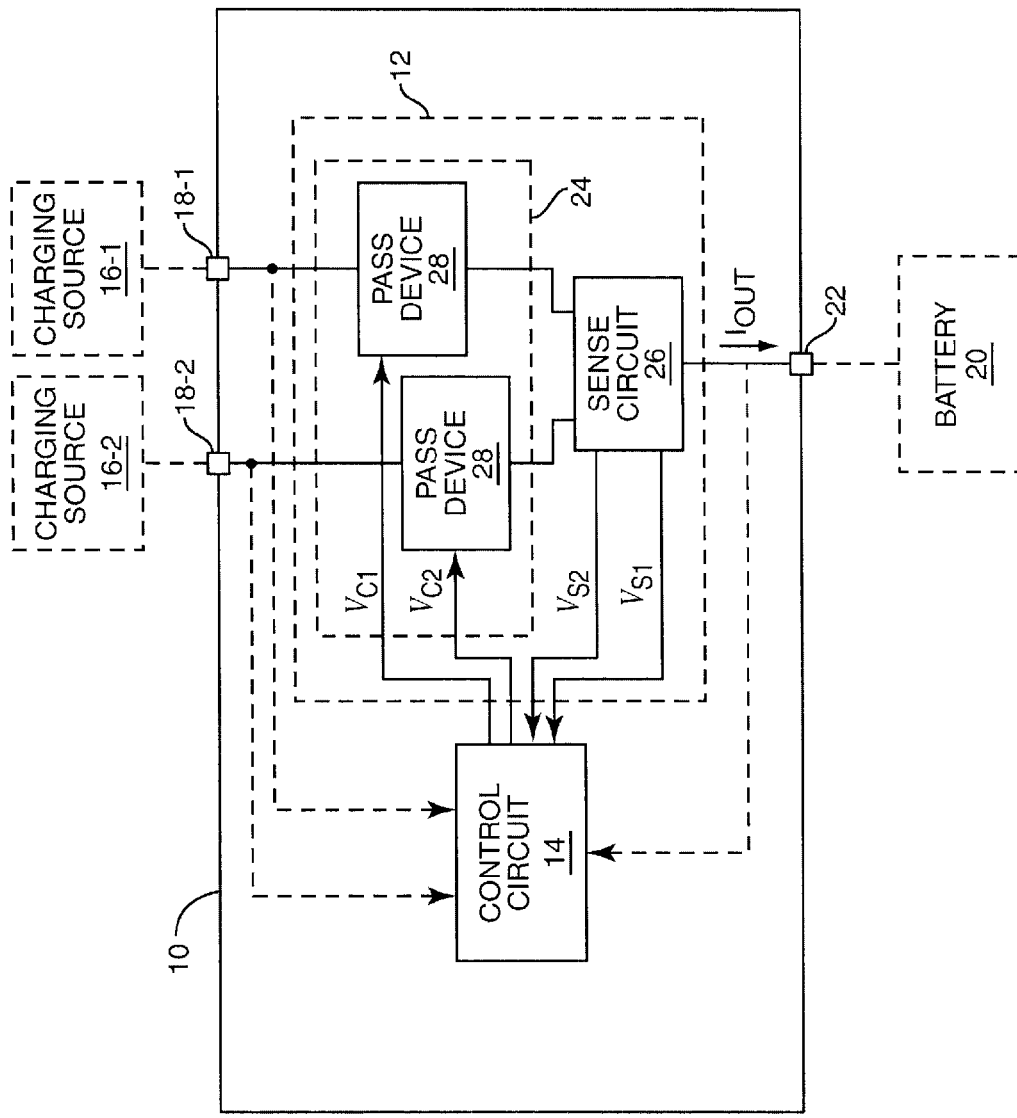
FIG. 6 is a block diagram of the details for an alternative exemplary charging circuit having two charging source input ports.

As a non-limiting example implementation, the charging circuit 12 illustrated in FIGS. 5 and 6 includes a sense circuit 26. The sense circuit 26 is configured to sense the charging current flowing from the battery charging circuit 10 to the attached battery 20. (More broadly, the sense circuit 26 may be used to sense the output current—$I_{out}$—from the battery charging circuit 10 to the battery 20, with the understanding that the output current may be the pre-charge current, the charging current, or the termination current.

Figure 7:
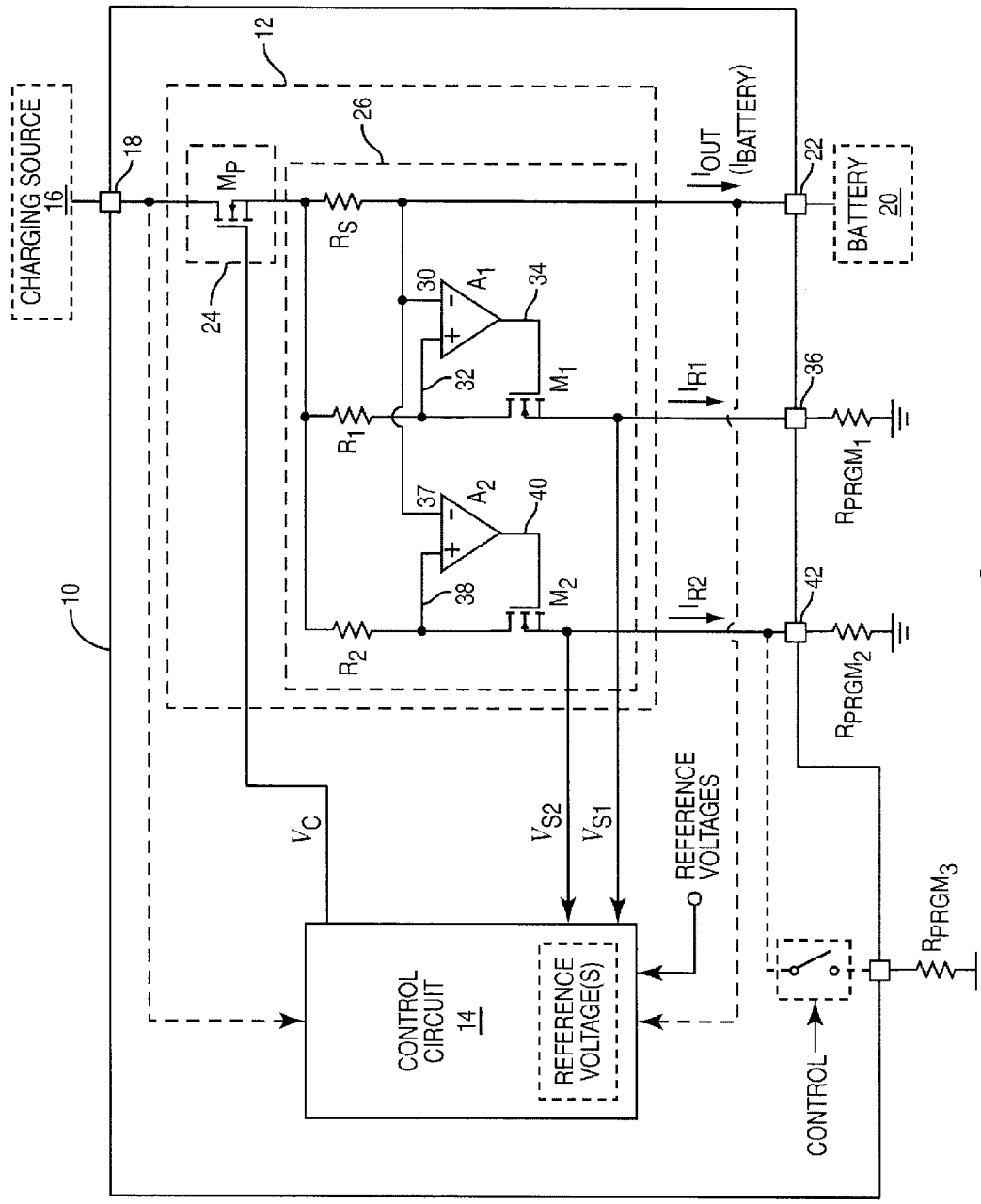
FIG. 7 is a block diagram of one exemplary implementation of a charging circuit.

FIG. 7 presents non-limiting details for such an embodiment of the sense circuit 26. The illustrated sense circuit 26 comprises resistors $R_S$, $R_1$, and $R_2$, amplifier $A_1$ having an inverting input 30, a non-inverting input 32, and an output 34, amplifier $A_2$ having an inverting input 37, a non-inverting input 38, and an output 40, and transistors $M_1$ and $M_2$. In operation, the amplifier A1 adjusts the transistor $M_1$ to make the voltage drop across $R_1$ equal to the voltage drop across $R_S$ caused by $I_{OUT}$ flowing through $R_S$. That is, with $R_S$ disposed in the output current path, the drop across the resistor $R_S$ is proportional to the magnitude of the charging current being output by the circuit 10.

By maintaining $I_{R1}$ proportional to $I_{OUT}$, where $I_{R1}/I_{OUT}=R_S/R_1$, and directing the current $I_{R1}$ through the program resistor $R_{PRGM1}$, one sees that the voltage signal $V_{S1}=R_{PRGM1}*I_{R1}$. However, because $I_{R1}=(R_S/R_1)*I_{OUT}$, $V_{S1}=R_{PGRM1}*I_{OUT}*(R_S/R_1)$. Therefore, the voltage signal $V_{S1}$, indicates the output current $I_{OUT}$, with a sensitivity programmed by $R_{PRGM1}$. The resistance value of $R_{PRGM1}$ determines the proportionality of $I_{OUT}$ to $V_{S1}$.

Like operations apply to the generation of $I_{R2}$ by the amplifier $A_2$ and transistor $M_2$. That is, the amplifier $A_2$ controls the transistor $M_2$ so that $I_{R2}$ produces a voltage drop across $R_2$ that is equal to the voltage drop across $R_2$ produced by the output current $I_{OUT}$. Therefore, the voltage $V_{S2}$ indicates the output current $I_{OUT}$, with a sensitivity (proportionality) programmed by $R_{PRGM2}$.

In at least one embodiment of this arrangement, $V_{S1}$-based sensing is used for controlling $I_{OUT}$ as a function of battery capacity, and $V_{S2}$-based sensing is used for controlling $I_{OUT}$ as a function of the source constraint. For example, for a given choice of programming resistor $R_{PGRM1}$, the various battery-capacity dependent proportional currents are all obtained by comparing different voltage references to $V_S$. One implementation of this uses reference voltages available within the circuit 10 that are positioned at 2.0V, 0.4V, and 0.2V, giving the circuit 10 capacity-based charging current thresholds at 100%, 20%, and 10%, respectively, of the programmed value for fast charge, pre-charge, and termination current. Note that FIG. 7 illustrates that the desired reference voltage signals may be applied to the control circuit 14, or generated within it, such as through the use of bandgap or other voltage reference circuits.

The same approach applies to the source constrained indicator, $V_{S2}$. In at least one circuit embodiment, the same reference voltages (2.0V and 0.4V), and the same $I_{OUT}$ sensing proportionality is used. Accordingly, the sensitivity of $V_{S1}$ to $I_{OUT}$ has the same functional dependency on $R_{PRGM1}$ as $V_{S2}$ to $I_{OUT}$ has on $R_{PRGM2}$. However, other sensitivity selections may be used.

Broadly, the idea is simply that the various fixed-proportion current set points or thresholds for the battery capacity programming circuit are obtained by comparing fixed-proportion voltage references to $V_{S1}$, and the sensitivity of output current to these references collectively varies as inverse $R_{PGRM1}$. Likewise, the various fixed-proportion current set points or thresholds for the source-constrained programming circuit are obtained by comparing fixed-proportion voltage references with $V_{S2}$, and the sensitivity of output current to these references collectively varies as inverse $R_{PGRM2}$. Thus, for capacity-based fast charging in the CC charging mode, the control circuit 14 produces an error signal that is the difference between $V_{S1}$ and a 100% voltage reference. That error signal, via a compensator and amplifier within the control circuit 14, drives transistor $M_P$ to change $I_{OUT}$ in a manner that drives the error signal ($V_{IREF}$-$V_{S1}$) to be zero. Thus the magnitude of the output current that makes $V_{S1}=V_{IREF}$ is programmed by selection of $R_{PRGM1}$.

Similarly, for pre-charging in the battery-capacity based mode of operation, the same $V_{S1}$ signal is compared to a 20% voltage reference, and for termination charging, the $V_{S1}$ signal is compared to a 10% voltage reference. Note that this latter set point yields a 10:1 ratio between fast charging current magnitude and termination current magnitude. From this arrangement, one also sees that the circuit 10 may set the termination current at the same capacity-based magnitude, irrespective of whether source-constrained or capacity-based charging is being used.

Further, those skilled in the art will appreciate that one or both of the programming elements $R_{PRGM1}$ and $R_{PRGM2}$ may be fixed internally or externally, or may be user-programmable or otherwise adjustable, as needed or desired. Adjustability allows the battery charging circuit 10 to be configured for operation with a range of different battery capacities, and/or for a range of different charging source constraints.

It should be further noted that the programming resistors $R_{PRGM1}$ and $R_{PRGM2}$ illustrated as the programming elements at terminals 36 and 42 represent non-limiting examples of how the desired capacity-based and constraint-based current limits can be set. Those skilled in the art will appreciate that other programming elements/arrangements may be used, e.g., other resistor arrangements and/or arrangements of other components may be used. Additionally, the impedance or other controlling values of the program components may be varied according to the type of charging source connected. For example, a battery charging circuit 10 may accept both low power and high power VBUS USB charging sources. $R_{PRGM2}$ may be set to program a reference current according to a 100 mA charging current limit for low power VBUS USB charging sources. A third resistor, $R_{PRGM3}$, may be selectively placed in parallel with $R_{PRGM2}$, to set the proper signal sensitivity for a high power VBUS USB charging source. That is, the combination of the $R_{PRGM2}$ and $R_{PRGM3}$ program resistors would produce the desired sensitivity for indicating $I_{OUT}$ according to the 500 mA charging current limit. Control signals, such as can be generated within the circuit 10, may be used to control the connectivity of $R_{PRGM3}$ or any other adjustable circuitry used to program the output current sensing.

Figure 8:
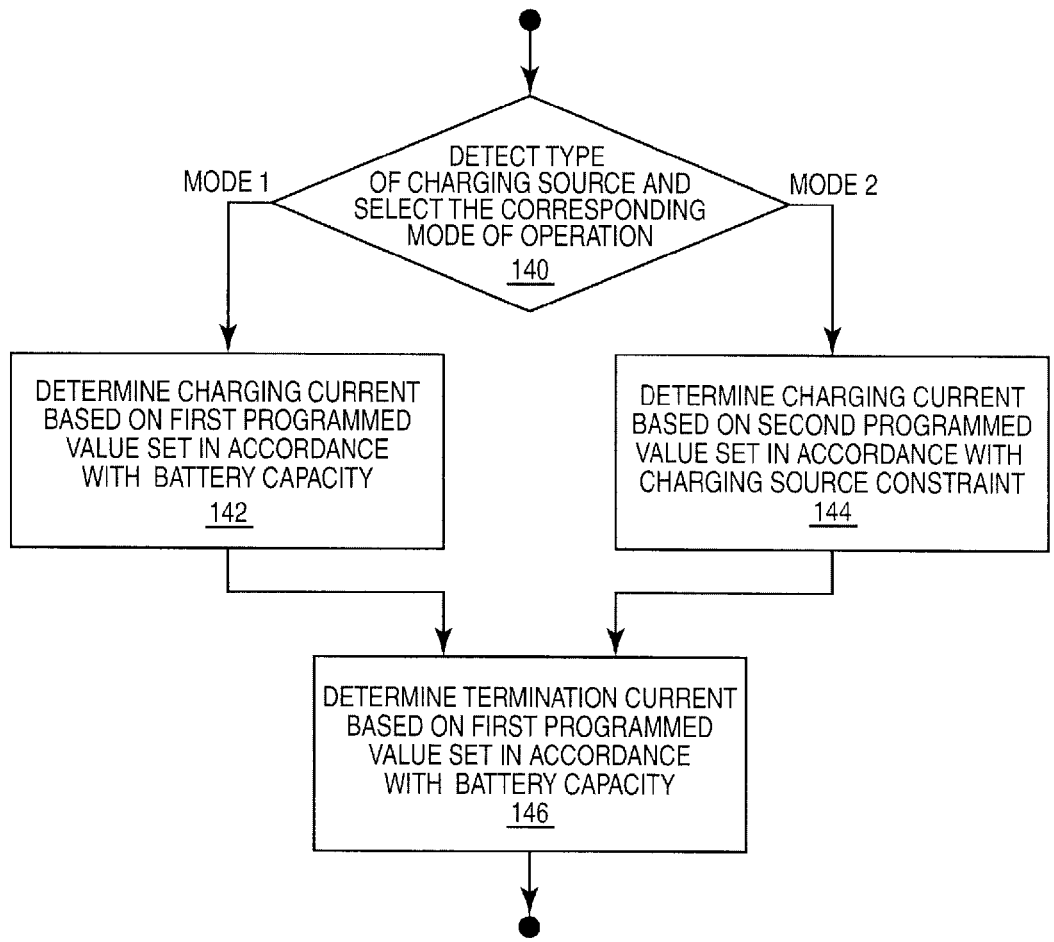
FIG. 8 is a logical flow diagram of one embodiment of the details for control processing implemented by an exemplary control circuit.

Regardless of the implementation details of the sense circuit 26, the resulting sense signals $V_{S1}$ and $V_{S2}$ are supplied to the control circuit 14 for its evaluation in controlling the output current from the circuit 10, according to capacity-based or source-constrained operation, respectively. FIG. 8 illustrates the basic processing taken in this context, and largely mirrors the processing previously described for FIG. 3.

In FIG. 8, processing begins with detecting the charging source type (Block 140), and correspondingly selecting MODE 1 or MODE 2 operation. For MODE 1 operation, processing continues with determining the charging current based on a first programmed value that is set according to the actual battery capacity of the battery 20, or is otherwise configured to be representative of the charging current that is appropriate for the battery 20 (Block 142).

Conversely, for MODE 2 operation, processing continues from Block 140 with determining the charging current based on a second programmed value that is set according to, or otherwise represents, a charging source constraint (Block 144). The charging source constraint may be, e.g., a maximum current limit and/or maximum loading value, which may be expressed as an under-voltage limitation. Regardless, whether in MODE1 or MODE2, the termination current is set based on battery capacity (Block 146).

In the processing context of FIG. 8 and elsewhere herein, the "first programmed value" may be considered to be the program resistor $R_{PRGM1}$, or, more particularly, as the output current ($I_{OUT}$) sensing sensitivity of the signal $V_{S1}$ as set by the selection of $R_{PRGM1}$. The second programmed value may be considered to be the value of $R_{PGRM2}$, or, more particularly, as the output current ($I_{OUT}$) sensing sensitivity of the signal $V_{S2}$, as set by the selection of $R_{PRGM2}$.

The charging current magnitude in MODE1 therefore is determined by the value of the voltage reference against which $V_{S1}$ is compared for pass circuit control during fast charging in MODE1. Thus, for a known, fixed voltage reference, the user sets the desired capacity-based charging current magnitude by setting the sensitivity of $V_{S1}$ to $I_{OUT}$ through appropriate sizing of $R_{PRGM1}$. In contrast, the charging current magnitude in MODE2 is determined by the value of the voltage reference against which $V_{S2}$ is compared for pass circuit control during fast charging in MODE2. Thus, for a known fixed voltage reference, which may be the same as used for MODE1 operation, the user sets the desired source-constrained charging current magnitude by setting the sensitivity of $V_{S2}$ to $I_{OUT}$ through appropriate sizing $R_{PRGM2}$.

Nonetheless, the battery charging circuit 10 sets the termination current magnitude in MODE2 as a function of battery capacity. For example, despite using $V_{S2}$ for controlling battery current magnitude during fast charging, the battery charging circuit 10 may use $V_{S1}$ for controlling battery current magnitude during termination charging. More particularly, in MODE1 and MODE2, the magnitude of $I_{OUT}$ may be controlled by comparing $V_{S1}$ to a reference voltage that is a desired fraction of the reference voltage used for capacity-based control of the charging current in MODE1. For example, the reference voltage used for termination current control in both MODE1 and MODE2 may be 10% of the reference voltage used for charging current control in MODE1. As such, the termination current is capacity-based, whether the battery charging circuit 10 operates in MODE1 or MODE2. (Capacity-based termination current in MODE2 also may be achieved by comparing $V_{S2}$ to an appropriate reference voltage, although that may complicate selecting the desired sensitivities for generating $V_{S1}$ and $V_{S2}$.)

Figure 9:
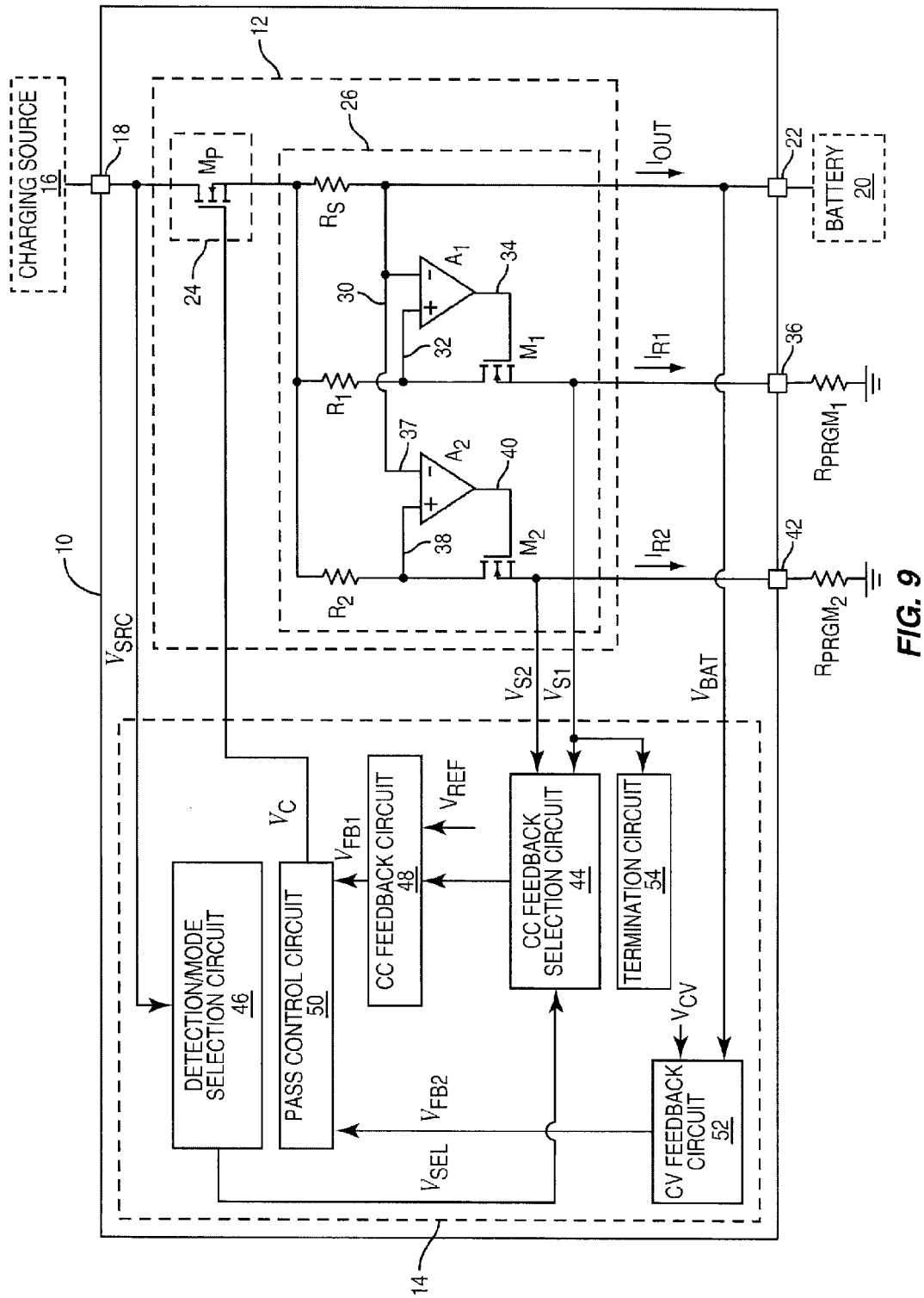
FIG. 9 is a block diagram of the details for an exemplary control circuit using a CC/CV charging algorithm.

In any case, a control circuit 14 configured to evaluate the sense signals $V_{S1}$ and $V_{S2}$ as described above is illustrated in FIG. 9. While FIG. 9 is illustrated with respect to a CC/CV battery charging circuit 10, those skilled in the art will appreciate that control circuit 14 may be modified to other charging algorithms and other types of batteries.

An exemplary control circuit 14 comprises a CC feedback selection circuit 44, a detection-and-mode selection circuit 46 (referred to as a detection/mode circuit 46), a CC feedback circuit 48, a pass control circuit 50, and a CV feedback circuit 52. As mentioned above, charging may begin in the CC charging mode such that the pass control circuit 50 controls the pass circuit 24 with control signal $V_C$, to maintain a desired constant charging current into battery 20. While operating in the CC charging mode, therefore, the pass control circuit 50 is responsive to a first feedback signal ($V_{FB1}$). In turn, $V_{FB1}$ may be generated by CC feedback circuit 48 as a function of either current sense signal $V_{S1}$ or $V_{S2}$, in dependence on the type of charging source detected by the detection circuit 46 and the resulting mode of operation selected by the mode selection circuit 46.

According to previous description herein, one embodiment of the detection/mode circuit 46 detects the type of charging source by recognizing which input port is active (e.g., 18-1 or 18-2 shown in FIG. 2). Alternatively, another embodiment of the detection/mode circuit 46 logically detects the type of charging source based on a control signal or other input value. Still further, another embodiment of the detection/mode circuit 46 senses or otherwise recognizes a voltage level or other signal characteristic to detect the type of charging source. Regardless of how it detects charging source type, at least one embodiment of the detection/mode circuit 46 provides a $V_{SEL}$ signal, or other control line, to the feedback selection circuit 44, which controls whether the feedback circuit 48 responds to the sense signal $V_{S1}$ (battery capacity) or $V_{S2}$ (charging source constraint).

In turn, the feedback circuit 48 drives the pass control circuit 50, which sets a control signal, $V_C$, for controlling the pass circuit 24. Thus, the pass circuit 24 controls the charging current flowing through it to match the value set by $R_{PGRM1}$ (battery capacity) or to match the value set by $R_{PGRM2}$ (charging source constraint), in dependence on which type of charging source is detected.

While the detection/mode circuit 46 controls the transition between the first and second modes of operation (i.e., charging current based on battery capacity or charging current based on source constraint), the relative values of $V_{IREF}$ and $V_{CV}$ control the transition between the CC and CV phase of charging. To illustrate, the CC phase of charging continues until the cell voltage of battery 20 rises to the float voltage, at which point the CV phase of charging begins. During the CC phase of charging, therefore, while pass control circuit 50 sets $V_C$ according to $V_{FB1}$, the pass control circuit 50 monitors a second, voltage feedback signal $V_{FB2}$ to determine when the CV phase should begin. The CV feedback circuit 52 may set $V_{FB2}$ such that pass control circuit 50 transitions to the CV phase whenever the voltage ($V_{BAT}$) of the battery 20 rises to a desired maximum voltage for the battery 20. As an example, the reference voltage $V_{CV}$ can be set to a value relating to the battery's desired float voltage.

Once $V_{BAT}$ rises to $V_{CV}$, the pass control circuit 50 transitions from monitoring $V_{FB2}$ to controlling the pass circuit 24 responsive to $V_{FB2}$. Unlike $V_{FB1}$ used during the CC phase of charging, however, $V_{FB2}$ does not depend on the mode of operation selected by mode selection 46. Further, the termination circuit 54 monitors the charging current for a termination condition. The termination circuit 54 is configured in one or more embodiments to set the termination current as a fixed fraction of the charging current corresponding to $R_{PGRM1}$.

Figure 10:
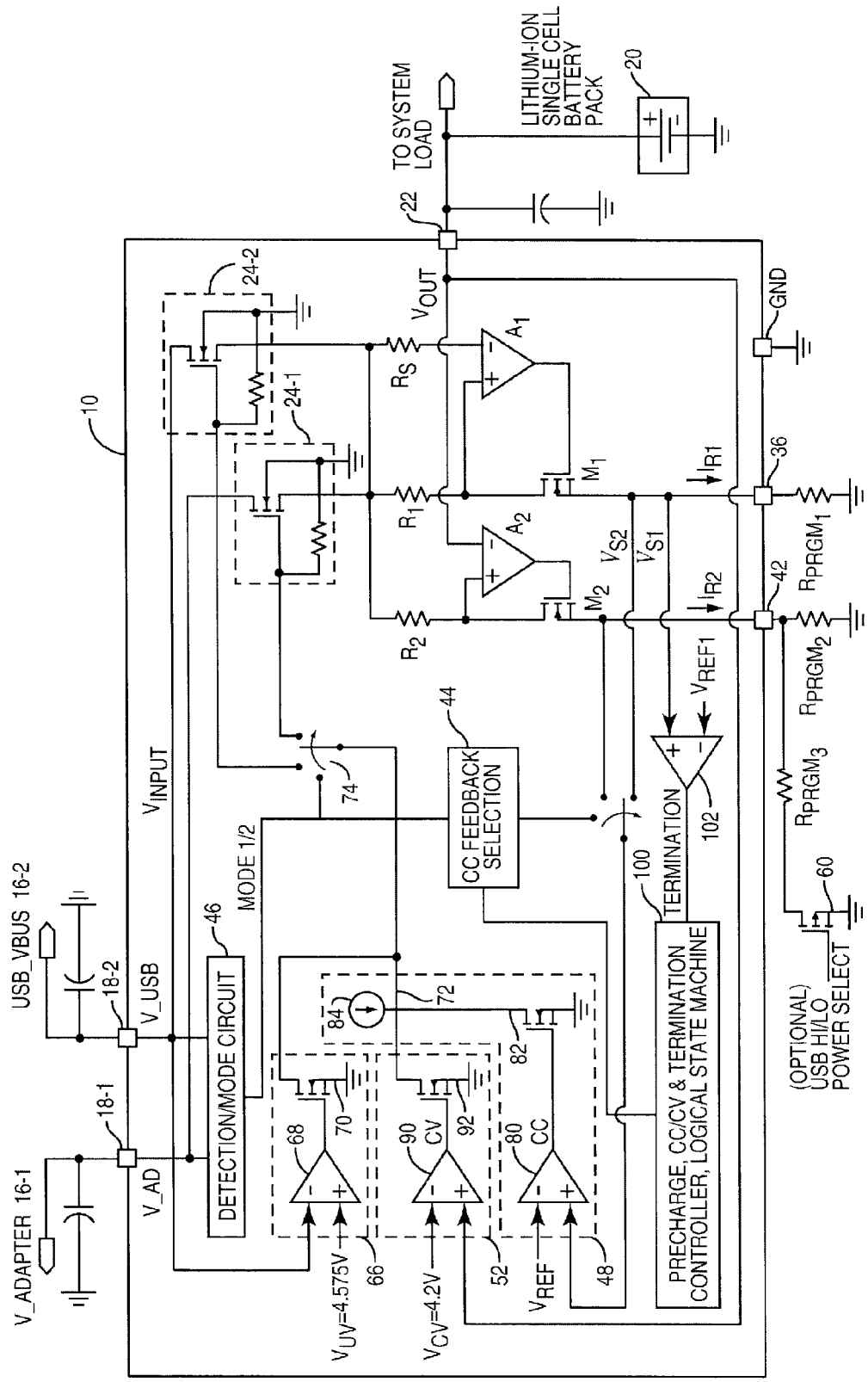
FIG. 10 is a block diagram of one exemplary implementation of the battery charging circuit.

FIG. 10 illustrates yet another embodiment of the battery charging circuit 10. It should be understood that this detailed example is a non-limiting illustration of physical and/or functional circuit arrangements offering advantageous operation in certain applications.

In FIG. 10, one sees the optional feature mentioned earlier, wherein a transistor 60 and resistor $R_{PGRM3}$ may be used to alter the value of $R_{PGRM2}$. Such an arrangement is convenient, for example, to switch between a charging source constraint of 100 mA for low-power USB operation (transistor 60 "off") and 500 mA for high-power USB operation (transistor 60 "on"). The control of the transistor 60 may be driven by a high/low operation select signal, which may be generated external to the battery charging circuit 10, or by control logic within it.

FIG. 10 illustrates another optional circuit; namely the under-voltage protection circuit 66, which includes an amplifier/comparator 68 and a transistor 70 in the illustrated embodiment. The under-voltage protection circuit 66 can be used in conjunction with controlling the charging current based on the sense signal $V_{S2}$ (or $V_{S1}$), such as to provide a further safeguard constraint. In such embodiments, for example, the charging current is held to the charging source constraint value, as defined by the $V_{S2}$-to-$I_{OUT}$ sensitivity and the voltage reference magnitude used by the control circuit 14 to evaluate $V_{S2}$, assuming that pulling that amount of current does not cause the source voltage ($V_{INPUT}$) from the source 16-2 to fall below a defined lower limit. That lower limit may be preconfigured or adjustable, and is represented in the illustration by $V_{UV}$ input to the non-inverting input of the amplifier 68.

In one or more other embodiments, the battery charging circuit 10 can, for its second (source-constrained) mode of operation, be configured simply to pull as much current as possible (e.g., up to the desired capacity-related charging current) without violating the under-voltage limit. Such operation represents an advantageous closed-loop control approach. For example, the battery charging circuit 10 can be configured to operate with a high-power USB charging constraint—e.g., the proportionality of $V_{S2}$ to $I_{OUT}$ can be set via selection of $R_{PGRM2}$, to reflect a 500 mA charging source limit. However, the under-voltage protection circuit 66 can be set to trip at the lower voltage limit defined for the low-power USB voltage bus (or at some safe margin above that value to allow for tolerances, etc.). In that manner, the battery charging circuit 10 will draw current up to the 500 mA limit, if it can do so without causing the USB voltage bus to drop out of its allowed operating range. Effectively, then, the battery charging circuit 10 operates as a high-power USB device, or at least operates at something above the nominal 100 mA limit, if it can do so without causing an under-voltage condition on the USB voltage bus.

Figure 11:
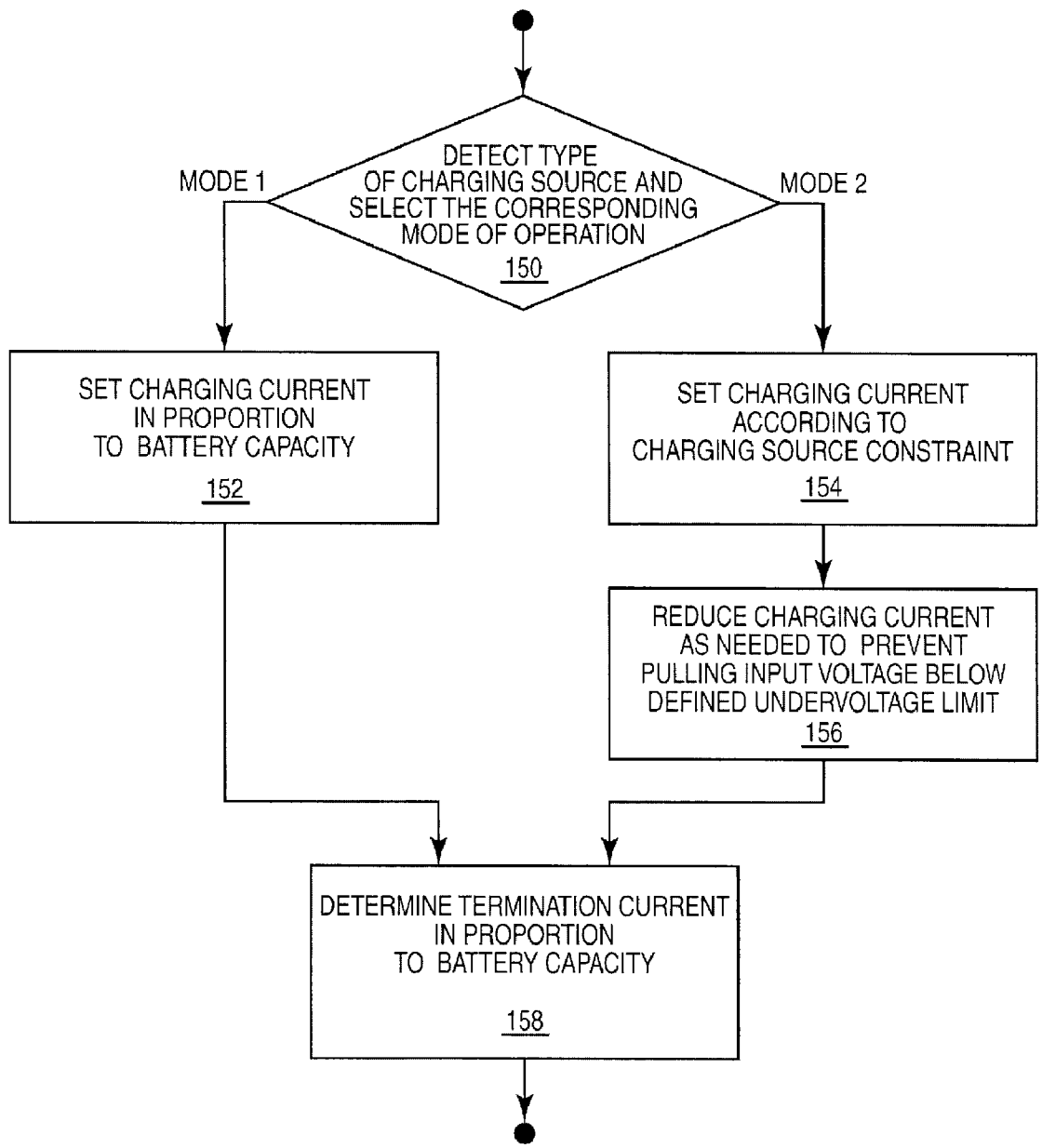
FIG. 11 is a logical flow diagram of one embodiment of the control steps implemented by an exemplary control circuit having an under-voltage protection circuit.

FIG. 11 illustrates one example of operation of the battery charging circuit 10 with under-voltage protection. The processing flow essentially mirrors that previously described for FIG. 3, with the exception of the operational safeguards provided by under-voltage detection processing.

The illustrated processing begins with selecting the mode of operation based on determining charging source type (Block 150). If MODE 1 is selected, the charging current is set according to battery capacity (Block 152), e.g., in proportion to battery capacity. Conversely, if MODE 2 is selected, processing includes setting the charging current according to the charging source constraint (Block 154). However, MODE 2 processing further includes operational safeguards provided by the under-voltage protection circuit 66 shown in FIG. 10. By virtue of the under-voltage protection circuit 66, the battery charging circuit 10 reduces charging current as needed, to prevent pulling the input voltage below a defined under-voltage limit (Block 156). As before, the termination current in both modes is set according to battery capacity (Block 158), e.g., in proportion to battery capacity, which may be expressed as desired fraction of the capacity-based charging current.

Operationally, then, the under-voltage protection circuit 66 provides dynamic, closed-loop feedback control during MODE 2 charging of the battery 20, to prevent excess loading of the charging source by the battery charging circuit 10. More particularly, the charging current is constrained not to go above a value that would cause the under-voltage limit set for the charging source to be violated.

Returning to FIG. 10, one sees that the under-voltage protection circuit 66 provides the above-described feedback control by providing its output signal to a node 72, which couples to the pass circuit 24-2 via a switch 74, which is controlled by the detection/mode circuit 46. The node 72 also connects to the outputs of the CC feedback circuit 48 and the CV feedback circuit 52. Note that two pass circuits are illustrated, one for the first mode of operation (24-1) where the charging current is set as a function of battery capacity, and one for the second mode of operation (24-2) where the charging current is set as a function of the charging source constraint.

Additionally, or alternatively, the input under-voltage limit control taught herein serves another purpose. In an example where the battery charging circuit 10 is coupled to a USB hub or other USB host along with one or more other devices in a USB network, the under-voltage limit control of the battery charging circuit 10 provides robustness to the USB network. That is, the battery charging circuit 10 can be configured to dynamically constrain the battery current it sources from the USB bus responsive to detecting under-voltage conditions on the USB network. In this manner, the battery charging circuit 10 varies its loading on the USB bus, responsive to detecting changing aggregate loading conditions on the USB bus, as inferred by the battery charging circuit's bus voltage/under-voltage monitoring. Note that such battery-current constraints may be imposed regardless of whether the actual battery current magnitude is at or below the target magnitudes for source-constrained USB low power or USB high power charging.

Turning back to the illustrated details, one also sees that the illustrated embodiment of the CC feedback circuit 48 includes an amplifier/comparator 80, a transistor 82, and a current source 84. In the first operating mode, where the charging current is tied to battery capacity as represented by $R_{PRGM1}$, the amplifier/comparator 80 compares a reference signal $V_{REF}$ to the $V_{S1}$ signal, which is dependent on $R_{PRGM1}$. In the second operating mode, where the charging current is tied to the source constraint as represented by $R_{PRGM2}$, the amplifier/comparator 80 compares the same or a different reference signal $V_{REF}$ to the $V_{S2}$ signal, which is dependent on $R_{PRGM2}$. (The CC feedback selection circuit 44 handles the $V_{S1}/V_{S2}$ selection responsive to detection/mode circuit 46.)

In other words, the same, fixed reference voltage, e.g., 4.0 Volts, may be used as a comparison reference for controlling the charging current $I_{OUT}$ during fast charging in either the capacity-based charging mode, or the source-constrained charging mode. In that case, the user will select the appropriate resistor values for $R_{PRGM1}$ and $R_{PRGM2}$, based on the 4.0 Volt reference. In other embodiments, the capacity-based and source-constrained charging modes may use different (or adjustable) reference voltages, such that comparison voltage used by amplifier/comparator 80 changes depending on whether the circuit 10 is operating in the capacity-based or source-constrained charging mode. In any case, it should be understood that the pass circuit 24 can be closed-loop controlled to fix the $I_{OUT}$ battery current at the desired magnitude, based on comparing either $V_{S1}$ or $V_{S2}$ to a given reference voltage.

In similar detail, the illustrated embodiment of the CV feedback circuit 52 includes an amplifier/comparator 90 and a transistor 92. The amplifier/comparator 90 receives the output voltage of the battery charging circuit 10 as one input, and a reference value ($V_{CV}$) as its other input, which may be set to the desired float voltage (or some scaled fraction of it), for example.

Finally, one sees a state machine or other processing circuit 100 that provides operational control for the battery charging circuit 10. The processing circuit 100 thus comprises at least a portion of the previously described control circuit 14, and may comprise all or part of the pass control circuit 50 shown in FIG. 9. Note, too, that the illustrated embodiment of the processing circuit 100 is shown in association with an amplifier/comparator 102, which may be used for termination current control.

In more detail, the amplifier/comparator 102 has one input tied to the $V_{S1}$ signal as used for sensing $I_{OUT}$. The other input is tied to a reference voltage, illustrated as $V_{REF1}$, which is fixed at, or otherwise adjusted to, the voltage level corresponding to the desired termination current. As noted before, the termination voltage can be set to a desired fraction of the appropriate capacity-based charging current, whether or not the battery 20 is actually charged at that current. Thus, in this illustrated embodiment, the source-constrained charging mode (MODE2) may be understood as controlling $I_{OUT}$ during fast charging by comparing $V_{S2}$ to the appropriate voltage reference (i.e., in amplifier/comparator 80), while termination current control is nonetheless based on comparing $V_{S1}$ to the appropriate reference voltage (i.e., in amplifier/comparator 102).

Broadly, it should be understood that the control circuit 14 may, for example, evaluate $V_{S1}$ for controlling $I_{OUT}$ during (MODE1) capacity-based fast charging and evaluate $V_{S2}$ for controlling $I_{OUT}$ during (MODE2) source-constrained fast charging. The control circuit 14 may compare $V_{S1}$ to a first voltage reference, such that the value of that voltage reference and the sensitivity of $V_{S1}$ to $I_{OUT}$ establishes the actual current magnitude target imposed by the circuit 10 on $I_{OUT}$ during capacity-based fast charging of the battery 20. Similarly, the control circuit 14 may compare $V_{S2}$ to the same (first) voltage reference, or to a different, second voltage reference. If the same reference is used, the programmed value (e.g., as set by $R_{PRGM2}$) may be used to set the $V_{S2}$-to-$I_{OUT}$ sensitivity that causes the control circuit 14 to impose $I_{OUT}$ current control at the desired target current during fast charging in the source-constrained mode.

Further, as explained earlier herein, the control circuit 14 may be configured to evaluate $V_{S1}$ for termination charging, irrespective of whether fast-charging was performed in MODE1 (capacity-based) or MODE2 (source-constrained). Alternatively, the $V_{S2}$ sensitivity can be made the same as that of $V_{S1}$, so that either $V_{S1}$ or $V_{S2}$ can be compared by the control circuit 14 to an appropriate reference voltage value for termination current control. As a further alternative, $V_{S2}$ and $V_{S1}$ can have different sensitivities, and two different reference voltages—one for $V_{S1}$-based termination current control and one for $V_{S2}$-based termination current control—may be used so that the termination current is the same, capacity-based magnitude, whether the control circuit 14 evaluates $V_{S1}$ or $V_{S2}$ during termination charging. Of course, the same or similar approach may be used for controlling pre-charge current.

Broadly, then, in one or more embodiments taught herein, a method of charging a battery comprises setting charging and termination current magnitudes according to battery capacity by, if operating in a first mode, setting charging current magnitude according to a charging source constraint, but setting termination current magnitude according to battery capacity if operating in a second mode. The method further comprises selecting the first mode if a first type of charging source is used, and selecting the second mode if a second type of charging source is used.

Setting the charging current magnitude according to battery capacity comprises, in at least one such embodiment, controlling the magnitude of the charging current by comparing a first sense signal to a first voltage reference. The first sense signal is generated by directing a first current that is proportional to battery current into a user-settable first program resistor whose size is selected such that the voltage of the first sense signal is at or about the voltage of the first voltage reference when the battery current is at a desired capacity-based charging current magnitude. Further, setting the termination current magnitude according to battery capacity comprises controlling the magnitude of the termination current by comparing the first sense signal to a second voltage reference. The second voltage reference is set at a desired fraction of the first voltage reference signal, such that the magnitude of the termination current is a desired fraction of the desired capacity-based charging current magnitude.

Further, setting the charging current magnitude according to the charging source constraint comprises controlling the magnitude of the charging current by comparing a second sense signal to the first or a third voltage reference. The second sense signal is generated by directing a second current that is proportional to battery current into a user-settable second program resistor whose size is selected such that the voltage of the second sense signal is at or about the voltage of the first or third voltage reference when the battery current is at a desired source-constrained current magnitude.

With the above and other points of variation and implementation flexibility in mind, those skilled in the art will appreciate that the present invention is not limited by the foregoing discussion or by the accompanying drawings. Indeed, the present invention is limited only by the following claims and their legal equivalents.

What is claimed is:

1. A method of charging a battery comprising:
   selecting a first mode of operation for a first type of charging source and selecting a second mode of operation for a second type of charging source;
   setting a charging current and a termination current in proportion to the battery's capacity when operating in the first mode; and
   setting the charging current according to a charging source constraint, while still setting the termination current in proportion to the battery's capacity, when operating in the second mode;
   wherein setting a charging current and a termination current in proportion to the battery's capacity when operating in the first mode comprises generating a first sense signal that is proportional to battery current, with a sensitivity established by a first programmed value set in accordance to battery capacity, controlling charging current magnitude based on comparing the first sense signal with a first reference signal, and controlling termination current magnitude based on comparing the first sense signal to a second reference signal.

2. The method of claim 1, further comprising setting a pre-charge current in proportion to the battery's capacity when operating in either the first mode or the second mode.

3. The method of claim 1, further comprising setting a pre-charge current in proportion to the battery's capacity when operating in the first mode, while setting the pre-charge current according to the charging source constraint when operating in the second mode.

4. The method of claim 1, wherein selecting a first mode of operation for a first type of charging source and selecting a second mode of operation for a second type of charging source comprises selecting the first mode of operation responsive to detecting that a charging source is connected to a first one of the two charging source inputs of a battery charging circuit, and selecting the second mode of operation responsive to detecting that a charging source is connected to a second one of the two charging source inputs.

5. The method of claim 1, wherein selecting a first mode of operation for a first type of charging source and selecting a second mode of operation for a second type of charging source comprises detecting a type of charging source connected to a charging source input of a battery charging circuit, and selecting the first mode or the second mode based on said detecting.

6. The method of claim 1, wherein setting the charging current according to a charging source constraint, while still setting the termination current in proportion to the battery's capacity, when operating in the second mode, comprises generating a second sense signal that is proportional to battery current, with a sensitivity established by a second programmed value set in accordance to the charging source constraint, controlling charging current magnitude based on comparing the second sense signal with the first or third reference signal, and controlling termination current based on comparing the first sense signal with the second or fourth reference signal.

7. The method of claim 1, further comprising limiting the charging current, at least while operating in the second mode, according to an under-voltage limit defined for a supply voltage used for sourcing the charging current, such that the charging current's magnitude is constrained to avoid violating the under-voltage limit.

8. The method of claim 7, further comprising defining the under-voltage limit according to Universal Serial Bus (USB) minimum bus voltages, such that the under-voltage limit protects against overloading a USB bus that serves as a supply source for the charging current.

9. A battery charging circuit comprising:
   a control circuit configured to:
      select a first mode of operation for a first type of charging source and select a second mode of operation for a second type of charging source;
      set a charging current and a termination current in proportion to a battery's capacity when operating in the first mode; and
      set the charging current according to a charging source constraint, while still setting the termination current in proportion to the battery's capacity, when operating in the second mode; and
   a charging circuit operatively associated with the control circuit and configured to provide said charging and termination currents to the battery under control of the control circuit; and
   a sense circuit configured to:
      generate a first sense signal that is proportional to battery current, with a sensitivity established by a first programmed value set in accordance to battery capacity; and
      generate a second sense signal that is proportional to battery current, with a sensitivity established by a second programmed value set in accordance to the charging source constraint.

10. The battery charging circuit of claim 9, wherein the control circuit is further configured to set a pre-charge current in proportion to the battery's capacity when operating in either the first mode or the second mode, and wherein the charging circuit is further operatively configured to provide said pre-charge current.

11. The battery charging circuit of claim 9, wherein the control circuit is further configured to set a pre-charge current in proportion to the battery's capacity when operating in the first mode, while setting the pre-charge current according to the charging source constraint while operating in the second mode, and wherein the charging circuit is further operatively configured to provide said pre-charge current.

12. The battery charging circuit of claim 9, wherein the battery charging circuit includes a detection/mode circuit that is configured to select or otherwise indicate the first mode of operation responsive to detecting that a charging source is connected to a first one of two charging source inputs of a battery charging circuit, and select or otherwise indicate the second mode of operation responsive to detecting that a charging source is connected to a second one of the two charging source inputs.

13. The battery charging circuit of claim 9, wherein the battery charging circuit includes a detection/mode circuit that is configured to select or otherwise indicate the first mode of operation responsive to detecting that a first type of charging source is connected to a charging source input of a battery charging circuit, and select or otherwise indicate the second mode of operation responsive to detecting that a second type of charging source is connected to the charging source input.

14. The battery charging circuit of claim 9, wherein the sense circuit generates first and second currents that follow battery current, and wherein the battery charging includes a first output terminal configured to source the first current into a first program resistor whose value corresponds to a desired capacity-based charging current magnitude, thereby generating the first sense signal, and wherein the battery charging circuit includes a second output terminal configured to source the second current into a second program resistor whose value corresponds to a desired source-constrained charging current magnitude, thereby generating the second sense signal.

15. The battery charging circuit of claim 14, wherein the battery charging circuit is configured to set the charging current while operating in the first mode by comparing the first sense signal to a defined reference signal, set the charging current while operating in the second mode by comparing the second sense signal to a defined reference signal, and set the termination current while operating in the first or second modes by comparing the first sense signal to a defined reference signal, which is a defined fraction of the defined reference signal used for setting the charging current while operating in the first mode.

16. The battery charging circuit of claim 9, wherein the control circuit is configured to constrain the charging current, at least while operating in the second mode, to prevent an under-voltage condition of a supply voltage serving as an input voltage to the battery charging circuit.

17. The battery charging circuit of claim 16, further comprising defining the under-voltage condition according to Universal Serial Bus (USB) minimum bus voltages, such that the battery charging circuit protects against overloading a USB bus that serves as a supply source for the charging current.

18. A method of charging a battery comprising:
setting charging and termination current magnitudes according to battery capacity, if operating in a first mode;
setting charging current magnitude according to a charging source constraint, but setting termination current magnitude according to battery capacity, if operating in a second mode; and
selecting the first mode if a first type of charging source is used, and selecting the second mode if a second type of charging source is used;
wherein setting the charging current magnitude according to the charging source constraint comprises controlling the magnitude of the charging current by comparing a second sense signal to the first or a third voltage reference, and generating the second sense signal by directing a second current that is proportional to battery current into a user-settable second program resistor whose size is selected such that the voltage of the second sense signal is at or about the voltage of the first or third voltage reference when the battery current is at a desired source-constrained current magnitude.

19. The method of claim 18, wherein setting the charging current magnitude according to battery capacity comprises controlling the magnitude of the charging current by comparing a first sense signal to a first voltage reference, and generating the first sense signal by directing a first current that is proportional to battery current into a user-settable first program resistor whose size is selected such that the voltage of the first sense signal is at or about the voltage of the first voltage reference when the battery current is at a desired capacity-based charging current magnitude.

20. The method of claim 19, wherein setting the termination current magnitude according to battery capacity comprises controlling the magnitude of the termination current by comparing the first sense signal to a second voltage reference, wherein the second voltage reference is set at a desired fraction of the first voltage reference signal, such that the magnitude of the termination current is a desired fraction of the desired capacity-based charging current magnitude.

* * * * *